(12) United States Patent
Lykke et al.

(10) Patent No.: US 12,433,237 B2
(45) Date of Patent: Oct. 7, 2025

(54) BOX FOR FOUR-LEGGED LIVE SLAUGHTER ANIMALS

(71) Applicants: MAREL MEAT A/S, Roskilde (DK); MAREL ICELAND EHF., Gardabaer (IS)

(72) Inventors: Leif Lykke, Roskilde (DK); Heinz Madsen, Roskilde (DK); Karl Sigurjonsson, Roskilde (DK); Patrick Westergaard, Roskilde (DK)

(73) Assignees: MAREL MEAT A/S, Roskilde (DK); MAREL ICELAND EHF., Gardabaer (IS)

(*) Notice: Subject to any disclaimer, the term of this patent is extended or adjusted under 35 U.S.C. 154(b) by 0 days.

(21) Appl. No.: 18/861,734

(22) PCT Filed: May 11, 2023

(86) PCT No.: PCT/EP2023/062563
§ 371 (c)(1),
(2) Date: Oct. 30, 2024

(87) PCT Pub. No.: WO2023/217942
PCT Pub. Date: Nov. 16, 2023

(65) Prior Publication Data
US 2025/0107501 A1   Apr. 3, 2025

(30) Foreign Application Priority Data

May 12, 2022 (EP) ..................................... 22173055

(51) Int. Cl.
*A01K 1/00* (2006.01)
*A01K 1/01* (2006.01)
*A22B 5/02* (2006.01)

(52) U.S. Cl.
CPC .............. *A01K 1/0047* (2013.01); *A01K 1/01* (2013.01); *A22B 5/02* (2013.01)

(58) Field of Classification Search
CPC .. A01K 1/0017; A01K 1/0023; A01K 1/0029; A01K 1/0035; A01K 1/0064;
(Continued)

(56) References Cited

U.S. PATENT DOCUMENTS

| | | | |
|---|---|---|---|
| 10,959,397 B2 * | 3/2021 | Polk | ..................... A01K 1/0245 |
| 2019/0110486 A1 | 4/2019 | Cousin et al. | |

(Continued)

FOREIGN PATENT DOCUMENTS

| | | | | |
|---|---|---|---|---|
| CN | 204489982 U | | 7/2015 | |
| CN | 107750983 A | * | 3/2018 | ........... A01K 1/0272 |

(Continued)

OTHER PUBLICATIONS

English translation FR 2554678 A1.*
(Continued)

*Primary Examiner* — Peter M Poon
*Assistant Examiner* — Danielle A Clerkley
(74) *Attorney, Agent, or Firm* — Workman Nydegger (57) ABSTRACT

A box is for containing one or more four-legged live slaughter animals prior to slaughter, and comprises: a bottom; two sidewalls extending along sides of the bottom, and having a length; a gated inlet formed at a first end of the sidewalls; and an end wall formed at a second end of the sidewalls and opposite from the inlet gate. The end wall is configured for allowing the one or more animals in the box to see through the end wall when at the inlet to the box, wherein a side wall is provided with a ventilation window formed as a through-going opening through the sidewall, and wherein the ventilation window comprises barring means for preventing an animal from extending its head (Continued)

through the ventilation window, which barring means are further configured to prevent an animal from viewing through the ventilation window as it enters the box through the inlet.

18 Claims, 6 Drawing Sheets

(58) Field of Classification Search
CPC ........ A01K 1/0088; A01K 1/01; A01K 1/015; A01K 1/0236; A01K 1/0245; A01K 1/0272; A01K 1/0281; A01K 1/0209; A01K 1/0227; A01K 1/034; A22B 5/02
See application file for complete search history.

(56) References Cited

U.S. PATENT DOCUMENTS

2020/0329664 A1* 10/2020 Edmonds ............. A01K 1/0245
2021/0120778 A1* 4/2021 Prehogan ............. A01K 31/08

FOREIGN PATENT DOCUMENTS

| | | | | |
|---|---|---|---|---|
| CN | 108432645 A | * | 8/2018 | ............. A01K 1/01 |
| DE | 3817103 A1 | | 11/1989 | |
| EP | 0441633 A2 | | 8/1991 | |
| EP | 0622021 A2 | | 11/1994 | |
| EP | 0643917 A2 | | 3/1995 | |
| EP | 1166626 B1 | | 8/2003 | |
| EP | 1676482 B1 | | 7/2008 | |
| FR | 2554678 A1 | * | 5/1985 | ........... A01K 1/0245 |
| NL | 1020915 C1 | | 9/2003 | |
| SE | 8502462 L | | 11/1986 | |
| SE | 454342 B | | 4/1988 | |
| WO | WO-2011108982 A1 | * | 9/2011 | ........... A01K 1/0245 |

OTHER PUBLICATIONS

English translation CN 106465683 A.*
English translation CN 108432645 A.*
Extended European Search Report from corresponding European Patent Application No. EP22173055.9, Nov. 10, 2022.
International Search Report from corresponding PCT Application No. PCT/EP2023/062563, Aug. 16, 2023.

* cited by examiner

BOX FOR FOUR-LEGGED LIVE SLAUGHTER ANIMALS

The present invention relates to a box for containing one or more four-legged live slaughter animals, in particular hoofed animals, prior to slaughter. Such boxes may be used for transporting the animal from a farm to a slaughter facility, and/or they may be used for keeping the animals in lairage at the slaughter facility and/or for transporting animals inside the slaughter facility for example between and/or into a workstation, such as an anaesthetization section of the slaughter facility.

The present invention makes it easier to make animals enter the box. In other aspects, the present invention concerns maximization of gas (air, $CO_2$, etc.) inflow into the box, without compromising the feature of making the animals enter the box.

BACKGROUND OF THE INVENTION

Transporting live poultry from farm to slaughter facility and for handling the poultry at the slaughter facility in cages is known in the art. However, chickens are relatively small animals and they have quite different behavioral patterns than mammal, four-legged slaughter animals, in particular hoofed animals.

The present invention builds on the realization that also four-legged slaughter animals, in particular hoofed animals may advantageously also be handled in transport to and/or at a slaughtering facility in cages or boxes, increasing the ease of handling, while simultaneously increasing the welfare of the animal during handling, and thereby also preserving or increasing meat quality, as the animals are less stressed during the process until slaughter.

Prior art containers for handling larger animals are known from e.g. DE 3817103 A1 and SE 8502462 B. Such containers or boxes are closed and therefore provides poor ventilation to the animals contained therein. EP 1166626 B1 discloses a modular cage having frame and grid walls. This provides better ventilation, but is undesirable because a view to all sides may distract and stress the animals when they are about to enter the cage.

However, there is a need for an improved box for handling four-legged, live slaughter animals before slaughter. It is an object of this invention to alleviate some of the problems of the prior art boxes for four-legged animals.

SUMMARY OF THE INVENTION

The objects of the invention are achieved by a box for containing one or more four-legged live slaughter animals, in particular hoofed animals, prior to slaughter, the box comprising
  a bottom;
  two sidewalls extending along sides of the bottom, and having a length;
  a gated inlet formed at a first end of the sidewalls; and
  an end wall formed at a second end of the sidewalls and opposite from the inlet gate;
wherein the end wall is configured for allowing the one or more animals in the box to see through the end wall at least when at the inlet,
wherein a side wall is provided with a ventilation window formed as a through-going opening through the sidewall, and
wherein the ventilation window comprises barring means for preventing an animal from extending its head through the ventilation window, which barring means are further configured to prevent an animal from viewing through the ventilation window as it enters the box through the inlet.

Thereby, it is achieved that an animal standing at the inlet/entrance to the box (or passing the inlet) can see through the opposite end wall of the box, while the sideways view is blocked for the animal, at least when the animal is at the entrance. Thereby, the animal cannot be disturbed from any activity sideways of the box, and the curiosity of some animals, for example pigs, can be utilized, as they will walk in a direction where they can see what is ahead without being disturbed by views to the sides. At the same time this arrangement allows to maximize the size of through-going passages in or between the barring means of the ventilation window, and thereby increasing the ventilation properties of the box, such that the air quality for the animals is increased during their stay in the box. Further, it increases gas inflow into the box, if for example the box with animals is entered into an anaesthetization section or apparatus of a slaughter facility.

In a preferred embodiment, the sidewalls may extend in parallel along the sides of the bottom.

When the sidewalls are parallel, the see-through feature of the end wall of the box can be formulated as allowing the one or more animals in the box to see through the end wall at least in a direction parallel to the side wall.

The barring means may be configured to prevent an animal from viewing through the ventilation window as it enters the box through the inlet for example by the baring means being shaped and sized, and arranged in a pattern, which prevent outlook through the sidewall ventilation windows from the box, when viewed from a position at the inlet of the box.

The sidewalls of the box preferably extend vertically upwards from the bottom.

The end wall and the inlet gate are preferably formed perpendicularly to the side walls.

In some embodiments both side walls are provided with a ventilation window.

In further embodiments the ventilation window may extend the entire length of the sidewall. Also, such ventilation windows may be provided in both side walls.

The ventilation window(s) is/are in some embodiments formed in the sidewall at least from the back height of the animals and up, according to the type (e.g. species, or height) of animal, for which the box is intended.

In an embodiment, the barring means are provided by a plurality of spaced apart vertical slats arranged side by side in a lengthwise direction of each ventilation window, a vertical slat opening being provided between neighboring slats, an inner slat surface of each slat facing towards an internal volume of the box, and an opposite outer slat surface facing towards an external side of the box, and each slat being angled relative to a longitudinal direction of the sidewalls.

Thereby a cost efficient way of preventing sideways view out of the box, at least from the entrance to box is provided. The slats further increase the stability of the box, which is weakened by the ventilation windows.

For the purpose of this application, a slat is an elongate plate shape member having two opposed slat surfaces, each having a length and a width.

Further, slats have a thickness.

The slats are angled relative to the lengthwise direction of the sidewalls such that when viewed from the inlet of the box, one of the opposed slat surfaces, the inner slat surface, face the viewer, such that inner slat surface of each slat is seen.

Preferably, the distance between two neighboring slats, and the mentioned angle is provided such that when viewed from the inlet of the box, no slat openings are visible.

The angle of the slats is defined by the slat surfaces relative to the longitudinal direction of the sidewall.

In one embodiment, the angle is 10-45°.

In other embodiments the slats of the barring means are tiltable along a vertical axis. Thereby, the angle may be altered, whereby the view out of the box and/or from the inlet to the box may be altered depending on e.g. the situation or the type of animal.

In other embodiments, as an alternative to the slats, the barring means may comprise a plurality of thin vertical rods arranged in a patterned array along the length of the ventilation window, such that viewing from the inlet of the box through the ventilation window is prevented.

In an embodiment, the ventilation window of a sidewall extends from an internal floor of the bottom to a top of the sidewall.

Thus, the area of the ventilation window is maximized.

In such embodiments, the barring means thus may also extend from the internal floor of the bottom to the top of the sidewall.

In further embodiments, where the ventilation window of a sidewall extends from an internal floor of the bottom to a top of the sidewall, a cover plate may be arranged on the inside of the barring means, the cover plate extending 10-30 cm above an internal floor of the bottom.

Thereby, the animals contained in the box are prevented from getting limbs caught between the barring means, of from getting bruised, e.g. when laying against the wall.

Such a cover plate may be made in a polymer material, e.g. plastic.

Preferably, the ventilation windows of both sidewalls are formed such that they extend from the internal floor of the bottom to the top of the sidewall.

In such embodiments, preferably, both the ventilation windows are provided with cover plates extending 10-30 cm above the internal floor of the bottom.

In alternative embodiments, a sidewall is provided with a lower portion comprising a closed surface extending 10-30 cm above an internal floor of the bottom.

Preferably, both sidewalls have a lower portion comprising such a closed surface.

The lower portion comprising the closed surface extending 10-30 cm above the internal floor of the bottom may be a plate integrated with a frame of the box. In this case the barring means may extend from an upper edge of the plate to a lower edge of the frame.

In a further embodiment of any of the previously described embodiments the box comprises a roof.

The roof may be formed as a lattice. Preferably the lattice extends from sidewall to sidewall. Preferably the lattice extends from the inlet to the end wall. Thereby, the ventilation of the box is increased. However, in other embodiments the roof may be provided with a window formed as a through-going opening, which take up only a portion of the roof. In such cases the window may be provided with a lattice. In either case the lattice may for example be formed by parallel bars or by a mesh.

In one embodiment, the roof of the box may comprise a roof gate. The roof gate may allow easier removal of lifeless animals from the box.

The roof gate may comprise the entire roof. Alternatively, a portion of the roof, may be provided with a gate.

In a further embodiment of any of the previously described embodiments the end wall of the box may comprise an end gate.

The end gate may comprise the entire end wall. Alternatively, a portion of the end wall, may be provided with a gate.

The end wall being provided with an end gate increases the flexibility of evacuating animals from a box. During loading animals into boxes, a number of boxes may be aligned inlet to end gate, with the inlet gates and the end gates open. Thereby animals may be driven into the boxes by utilizing their desire to follow other animals, the gates closing as the desired number of animals having entered each box.

In any of the previously described embodiments the box may further be provided with a drinking water supply into the box.

For example the drinking water supply may be provided through a wall of the box, the drinking water supply comprising a pipe having a first end extending into the box, and a second end extending out of the box, wherein the first end may be provided with a drinking nipple (or to a tank, or to a trough), and the second end may be provided with connection means configured for connecting the pipe to an external water supply.

By external water supply is meant external relative to the box.

Thus, in these embodiments the box is equipped with means for providing water into the box, the drinking water supply comprising means (the pipe) connected to the box, configured for connecting to an external water supply.

In an embodiment thereof, and where the barring means are formed as slats, the drinking water supply is provided through a water supply opening through the slats. Thus, the pipe extends through the water supply opening. It may be connected to a slat. It will be appreciated that a similar water supply opening may be provided through other types of barring means.

Alternatively, the drinking water supply may be provided at a wall of the box, the drinking water supply having a first end extending into the box volume, and a second end connecting to a water tank integrated in the box.

The first end may supply a trough located on a floor or inner sidewall of the box, or it may be provided with a drinking nipple.

In an embodiment thereof, the water tank is integrated in the bottom.

In this case the water tank may be pressurized or connected via a pump installed in the box, to allow water to be provided into the box volume via the pipe.

Alternatively, the water tank is integrated in the roof.

Alternatively, the water tank is attached to a surface of the roof.

If the water tank is provided in or at the roof, the need for pressurizing the tank may be dispensed of.

Alternatively, the water tank is integrated in a sidewall or in the end wall. In one embodiment hereof the water tank may be formed in the barring means such as in in some or all of the slats, or in a solid portion of the sidewall.

Alternatively, the water tank is attached to a surface of a side wall or the end wall.

Alternatively, the water tank is integrated into a corner post of the box.

In either case, the first end of the drinking water supply may preferably be provided above back height of the animal type for which the box is intended.

In embodiments, alternative to the drinking water supply having parts on the box as such, a water supply opening may be provided through a wall of the box, the water supply opening being configured to allow insertion of an external drinking water supply into the box volume. Such an external drinking water supply may comprise a drinking nipple. Alternatively, water may be supplied to a trough.

Thereby, water may be supplied to animals in the box by placing the box in connection with a water source system.

In an embodiment, the water supply opening is provided through the slats barring the ventilation window of a sidewall.

In a further embodiment of any of the previously described embodiments,
- the bottom comprises a tank for collection of manure and urine;
- an internal floor of the bottom comprises one or more floor elements having openings formed there through for allowing manure and urine to pass; and
- the openings are in fluid communication with the tank.

In an embodiment hereof the internal floor of the bottom comprises a plurality of floor elements, where the openings are formed as elongate slots formed there between. In an embodiment hereof, the slots are less than or equal to 25 mm wide.

In a further embodiment of any of the previously described embodiments, the box is rectangular, having a width from sidewall to sidewall, and where the width to length ratio is 4:5 or smaller. In a further embodiment, the width is 1.5 meters and the length of the box 2.5 meters to 10 meters. In a further embodiment, width is in the interval from 1.5 meters to 2 meters, and the length of the box 2.5 meters to 10 meters. In a further embodiment, the width is 2 meters and the length of the box 2.5 meters to 10 meters.

As an example, the box may be utilized for containing 1-15 pigs, such as 7-8 pigs.

In an embodiment, the bottom may be detachably connected to the box.

In an alternative embodiment the bottom is hinged to a side wall, or the end wall or the inlet end.

The box, or portions thereof may be formed in a metal, e.g. steel or aluminium. Alternatively, the box or portions thereof may be formed in a polymer material, e.g. plastic. Alternatively, the box or portions thereof may be formed in a composite material.

In one embodiment, the box or portions thereof may be formed with a metal frame and having one or more walls formed in plastic.

For the purpose of this application by four-legged animals, in particular hoofed animals is meant in particular porcine, bovine, caprine, and equines/equid animals.

Porcine animals cover pigs/swine. Bovines comprise a diverse group of 10 genera of medium to large-sized ungulates, including domestic cattle, bison, African buffalo, water buffalos, and the four-horned and spiral-horned antelopes. Caprine animals are goats and sheep. Equines/equid animals are horses, donkeys, and zebras. Bovines and goats: bovidae (lat.). The bovidae comprises the biological family of cloven-hoofed, ruminant mammals that includes cattle, bison, buffalo, antelopes, and goat-antelopes. A member of this family is called a bovid.

In the context of the present invention, the term "window" and "ventilation window" is intended to mean a through-going opening or aperture through a wall, which will allow air to pass through. Such a window/ventilation window may be partly covered, but will have one or more through going passages.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the invention will be described in greater detail with reference to embodiments shown by the enclosed figures. It should be emphasized that the embodiments shown are used for example purposes only and should not be used to limit the scope of the invention.

DETAILED DESCRIPTION OF THE EMBODIMENTS

Figure 1:
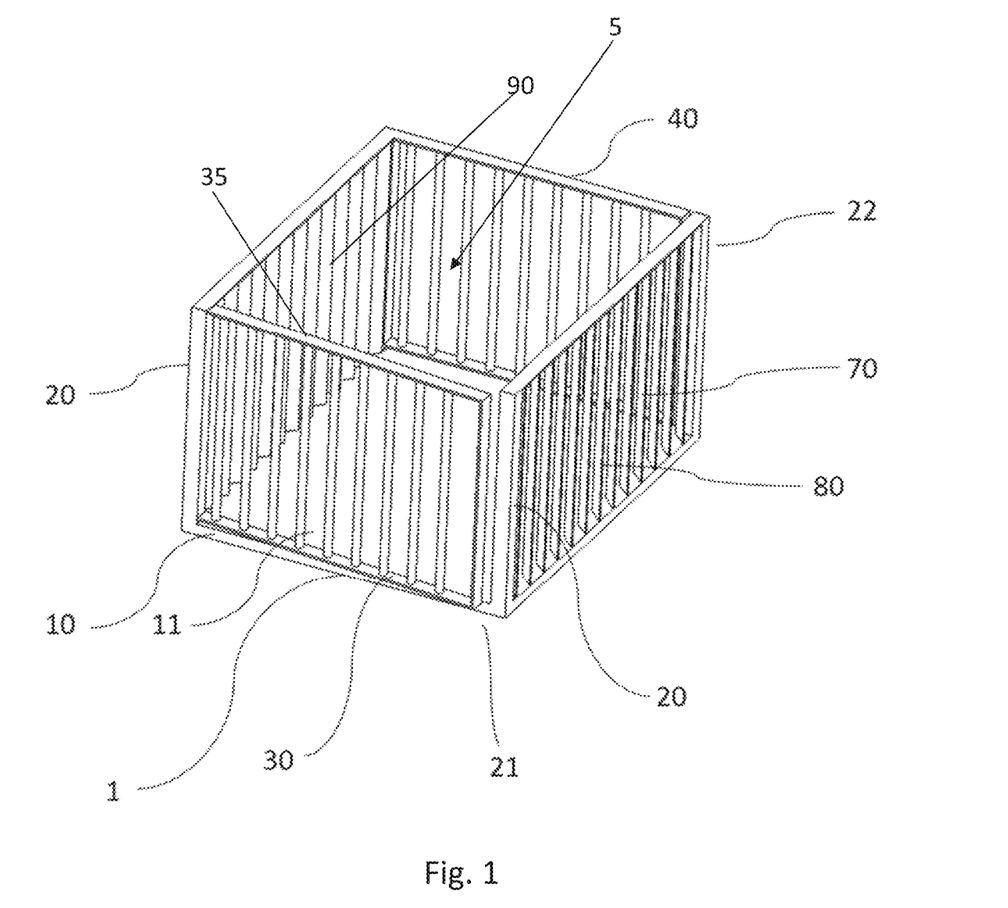
FIG. 1, in a perspective view, shows a box according to an embodiment of the invention.

FIG. 1 shows an embodiment of a box 1 for the use in handling one or more four-legged live slaughter animals, in particular hoofed animals, prior to slaughter. The animals, for example pigs, may be filled into such boxes, which may be used for one or more of the following:
- Transporting the animals from e.g. a farm to a slaughtering facility,
- Temporarily resting the animals in a lairage provided at the slaughtering facility; and
- Handling the animals between workstation of the slaughtering facility, such as between a receiving section and the lairage, the lairage and an anaesthetization apparatus, and inside such an anaesthetization apparatus.

Using boxes for filling and later lairageing of animals such as pigs, allows to increase speed (capacity) when filling at a loading ramp and efficient rest time in the lairage area, and hereby securing continuous supply of anesthetized animals to the slaughtering position. It may also be used to calm the animals, as a group size of the animals may be selected to comply with the natural behavioral pattern of the animals. For example, pigs get more anxious if alone or in too large groups.

Also, the use of boxes at a slaughtering facility allows a gentler handling around the slaughtering facility and between workstations of the slaughtering facility. This also results in more relaxed animals and thus less damage of meat from the slaughtered animals.

As shown in FIG. 1 the box may comprise a bottom 10, and two sidewalls 20, an inlet 30 and an end wall 40.

The sidewalls 20 each has a first end 21 and a second end 22. The inlet is formed at the first end and the end wall is formed opposite thereto at the second end 22 of the sidewall 20 of the box 1.

The sidewalls 20 extends along sides of the bottom 10, and has a length in a longitudinal direction from the inlet 30 to the end wall, and a width from sidewall to sidewall, or from the sides of the bottom 10.

The inlet 30 is gated to allow one or more animals to enter the box 1, and may also function to remove animals therefrom.

In the embodiment shown in FIG. 1 the gate of the inlet 30, inlet gate 35, is shown to be provided with a lattice of vertically extending and spaced apart bars. In the embodiment shown, the lattice of bars extends from a bottom of the gate to the top of the gate. Thereby, ventilation of the box is increased. It will however be appreciated that in other—not shown—embodiments, the gate may comprise other means for preventing an animal in the box from escaping the box or from extending limbs out of the box 1. Such means may comprise a mesh or partially of fully covering closed surfaces.

The end wall 40 is configured for allowing the one or more animals entering into the box 1 to see through the end wall 40. The see-through feature must be provided at least when the animals are positioned at the inlet 30 to the box 1.

As shown in FIG. 1 such a see-through function may be provided by the end wall 40 being provided with a lattice of vertically extending and spaced apart bars.

In a preferred embodiment, the sidewalls 20 may extend in parallel along the sides of the bottom 10. When the sidewalls 20 are parallel, the see-through feature of the end wall 40 of the box 1 can be formulated as allowing the one or more animals, when in the box 1 or at least when entering the box 1, to see through the end wall 40 at least in a direction parallel to the side wall 20.

The sidewalls 20 of the box 1 preferably, and as shown, extend vertically upwards from the bottom 10.

As shown in FIG. 1, preferably the end wall 40 and the gate at the inlet 30 are formed perpendicularly to the side walls 20.

The end wall 40 being see-through provides for easier loading of animals into a box 1, because many types of animals, including pigs do not like to enter into a closed, unfamiliar space. The see-through feature stimulates the curiosity of the animals, in particular pigs, to explore what is inside the box and beyond.

Further the lattice formed by the spaced apart bars, provides an open structure, which increase the ventilation to the internal space 5 of the box 1.

In the embodiment shown in FIG. 1, one gate covers the entire inlet. In other—not shown—embodiments, the gate may cover only a part of the inlet 30, walls covering the other parts of the inlet, in this situation. In yet other embodiments, the gate closing the inlet may be divided into two separate portions.

In the embodiment shown in FIG. 1, it is indicated that the gate covering the inlet is hinged such that it may open/close in a pivotal manner. In other—not shown—embodiments, the gate or gates of the inlet 30 may be slidably arranged to cover the inlet 30.

At least one of the side walls 20 are provided with a ventilation window 70, formed as a through-going opening through the sidewall 20, where the ventilation window 70 comprises barring means 80. The barring means 80 are formed within the opening provided by the ventilation window 70. The barring means 80 are at least configured for preventing an animal from extending at least its head through the ventilation window 70.

We note that in the embodiment shown in FIG. 1, a ventilation window 70 is provided in each of the two sidewalls 20.

As shown in FIG. 1, the ventilation windows 70 in this embodiment extend over the entire side wall from top to bottom and from the first end 21 of the sidewall 20 to the second end 23 of the sidewall 20. Thereby, the size of the ventilation window is maximized, and the ventilation through the ventilation widow is increased.

In other—not shown—embodiments, a ventilation window 70 may cover a smaller area of the sidewall 70.

The barring means are further configured to prevent an animal from viewing through the ventilation window 70, at least when the animal is at the inlet 30, when it enters the box 1 through the inlet 30.

Many four-legged slaughter animals are cautious about structures and/or movements sideways of them, especially when moving. Therefore, by preventing a sideways view, at least at the inlet 30 of the box 1, animals can more easily be made to enter a box 1.

By the combination of features described above it is achieved that an animal standing at the entrance/inlet 30 to the box 1, or passing it, can see through the opposite end wall of the box, while the sideways view is blocked for the animal, at least when the animal is at the inlet/entrance 30. Thereby, the animal cannot be disturbed from any activity sideways of the box, and the curiosity of some animals, for example pigs, can be utilized, as they will walk in a direction where they can see what is ahead without being disturbed from the sides. At the same time this arrangement allows to maximize the size of through-going passages of the ventilation window 70, and thereby increase the air quality for the animals during their time in the box 1, and increase gas inflow into the box, if for example the box with animals is entered into an anaesthetization section or apparatus of a slaughter facility.

The barring means 80 may be configured to prevent an animal from viewing through the ventilation window 70 as it enters the box through the inlet for example by the barring means being shaped and sized, and arranged in a pattern, which prevent outlook through the sidewall 20 ventilation window(s) 70 through from the box 1, when viewed from a position at the inlet 20 of the box 1.

The barring means 80 are configured to prevent an animal from viewing through the ventilation window(s) 70 as it enters the box through the inlet, for example, by the baring means 80 being shaped and sized, and arranged in a pattern, which prevent outlook through the sidewall ventilation windows from the box, when view from a position at the inlet of the box.

Figure 2:
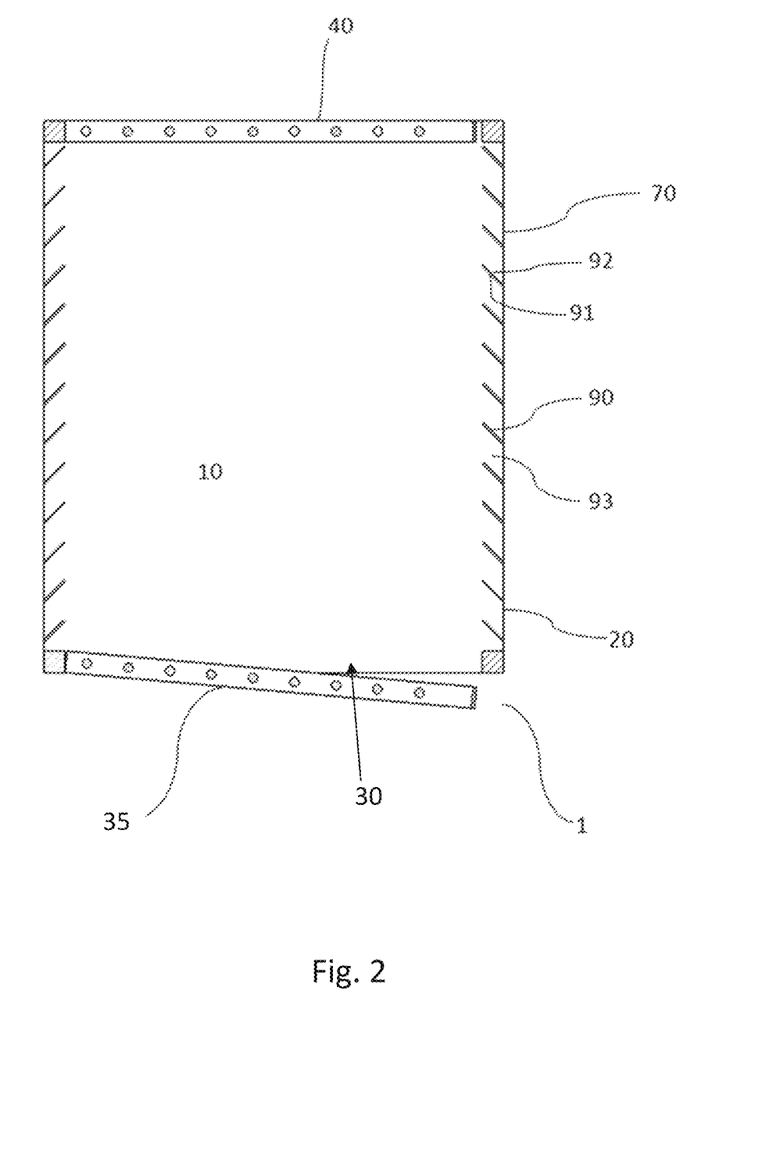
FIG. 2 shows a top sectional view through the box shown in FIG. 1.

Now referring in particular to FIG. 2, the barring means 80 may as shown and in preferred embodiments be provided by a plurality of spaced apart vertical slats 90. These slats 90 are arranged side by side in a lengthwise/longitudinal direction of each ventilation window 70, such that a vertical slat opening 93 is provided between neighboring slats 90. Thus, an inner slat surface 91 of each slat 90 faces towards an internal volume 5 of the box 1, and an opposite outer slat surface 92 faces towards an external side of the box 1.

As shown, each slat 90 is preferably angled relative to a longitudinal direction of the sidewalls.

The slats 90 are angled relative to the lengthwise/longitudinal direction of the sidewalls 20, such that when viewed from the inlet 30 of the box 1, one of the opposed slat surfaces, the inner slat surface 91, faces the viewer, and such that inner slat surfaces 91 of each slat 90 is seen.

Preferably, the distance between two neighboring slats 90, and the mentioned angle is provided such that when viewed from the inlet 30 of the box, no slat openings 93 are visible.

The angle of the slats 90 is defined by the slat surfaces 92 relative to the longitudinal direction of the sidewall 20. In one embodiment, the angle is 10-45°.

The non-see-through effect of the slats may be appreciated from e.g. FIG. 1 where we view the box from the inlet 30 end thereof, and where—on the left-hand side of the figure—viewing trough the ventilation window 70 through (left) side wall 20 is blocked.

When the animal has entered a box, sideways viewing is possible through the slat openings 93 when viewing in the direction from the end wall 40 towards the inlet 30.

In other—not shown—embodiments, slats 90 of the barring means 80 are tiltable along a vertical axis. Thereby, the angle of the slats relative to the longitudinal direction of the box may be altered. Thereby the view out of the box 1 from the inlet of the box 1 may be altered depending on e.g. the situation or the species, race, sex and/or age of animal.

In other—not shown—embodiments, as an alternative to slats 90, the barring means 80 may comprise a plurality of thin vertical rods arranged in a patterned array along the length of the ventilation window, such that viewing from the inlet 30 of the box 1 through the ventilation window 70 is prevented.

In principle it may be possible that the barring means 80 are provided with horizontally arranged slat, where the slats angled relative to a horizontal plane parallel to the bottom, and arranged such that the animals cannot see sideways of the box, at least when the animal is at the inlet to the box.

As mentioned above, in the embodiment shown in the figures, the ventilation window 70 of the sidewall 20, extends from an internal floor 11 of the bottom 10 to a top of the sidewall 20. Thus, the area of the ventilation window 70 is maximized.

In these embodiments, the barring means 80 thus extends from the internal floor 11 of the bottom 10 to the top of the sidewall 20.

Figure 3:
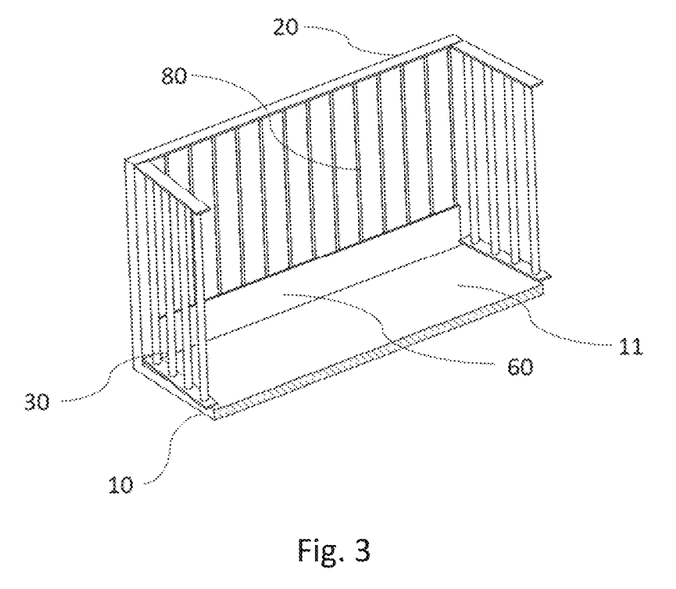
FIG. 3 shows a longitudinal, vertical section through box shown in FIG. 1.

In further embodiments, where the ventilation window 70 of a sidewall 20 extends from an internal floor 11 of the bottom to a top of the sidewall 20, a cover plate 60 may be arranged on the inside of the barring means 80, as shown in FIG. 3. Such a cover plate 60 may extend from 10 to 30 cm above an internal floor 11 of the bottom 10.

Such a cover plate 60 may be made in a polymer material, e.g. plastic.

The cover plate 60 may prevent, that an animal contained in the box get limbs smaller than its head (for example hoofs or snout) caught between the barring means 80. Further, the cover plate 60 may prevent that the animal, e.g. when laying down and resting against the sidewall 20, from getting bruised by the barring means 80. Further, such a cover plate 60 may prevent manure and urine from the animals from falling out of the box 1.

In such embodiments, and as shown in the figures, where the ventilation window 70 of both sidewalls 20 are formed such that the barring means 80 extend from the internal floor 11 of the bottom 10 to the top of the sidewall 20, both the ventilation windows are preferably provided with cover plates 60 extending 10-30 cm above the internal floor 11 of the bottom 10.

Figure 4:
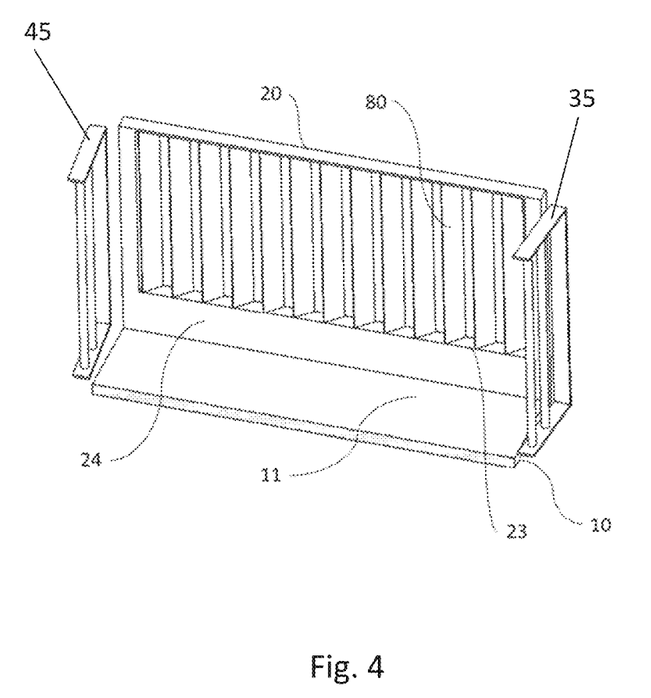
FIG. 4 shows a longitudinal, vertical section through box shown in FIG. 1.

As an alternative to a cover plate 60, a sidewall 20 of the box 1 may be provided with a lower portion 24 comprising a closed surface, which extends 10-30 cm above an internal floor 11 of the bottom 10. This is illustrated in FIG. 4. Preferably, both sidewalls 20 has such lower portions 24 comprising a closed surface.

The lower portion 24 comprising the closed surface preferably extends 10-30 cm above the internal floor 11 of the bottom 10, and may be a plate integrated with a frame of the box 1. In this case the barring means 80 may extend from an upper edge of the plate/lower portion to a lower edge of the frame, which preferably defines the top of the sidewall 20.

The lower portion comprising the closed surface extending 10-30 cm above the internal floor 11 of the bottom 10 may be a plate integrated with a frame of the box. In this case the barring means may extend from an upper edge 23 of the plate to a lower edge of the frame.

Figure 5:
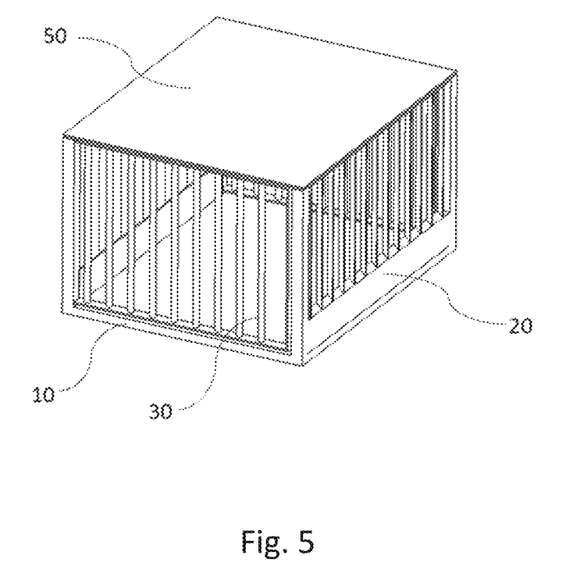
FIG. 5, in a perspective view, shows a box according to an embodiment of the invention, where the box is provided with a roof.
Figure 6:
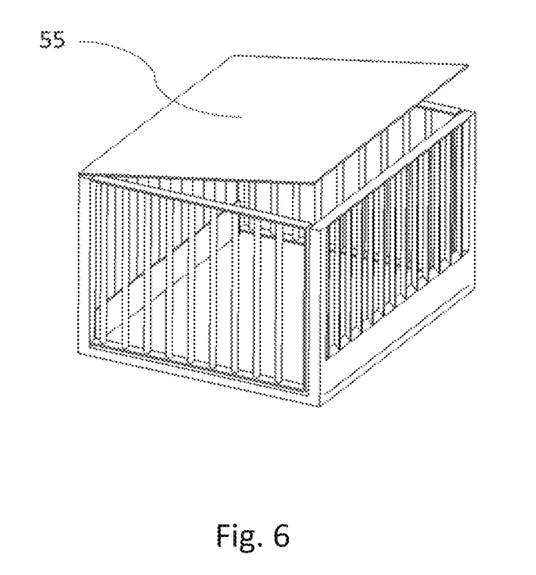
FIG. 6, in a perspective view, shows a box according to an embodiment of the invention, where the box is provided with a roof, and the roof comprises a roof gate.

Now referring to FIGS. 5 and 6, the box may further comprise a roof 50. As indicated in FIGS. 5 and 6, the roof 50 may in some embodiments be formed as a plate covering a top opening over the internals space 5 of the box 1.

However, preferably, the roof 50 may be formed as or comprise a lattice. Preferably the lattice extends from sidewall 20 to sidewall 20. Preferably the lattice extends from the inlet 30 to the back wall 40. Thereby, the ventilation of the box 1 is increased.

However, in yet other embodiments the roof 50 may be provided with a window formed as a through-going opening, which takes up only a portion of the roof 50. Also, in such embodiments the window may be provided with a lattice.

In either case the lattice may for example be formed by parallel bars, or by a mesh.

As further shown in FIG. 6, in some embodiments, the roof 50 of the box may comprise a roof gate 55. The roof gate 55 may allow easier removal of e.g. lifeless animals from the box 1, and at least increases the number of ways to access the internal space 5 of the box 1.

As shown in FIG. 6, the roof gate 55 may comprise the entire roof. In alternative—not shown—embodiments, a portion of the roof 50, may be provided with a roof gate 55. Thus, a roof gate 55 may cover only a part of the top opening, roof walls covering the other parts of the top opening in this situation.

In yet other (also not shown) embodiments, the roof gate 55 closing the top opening of the box 1 inlet may be divided into two separate portions.

In the embodiment shown in FIG. 6, it is indicated that the roof gate 55 covering the top opening is hinged, such that it may open/close in a pivotal manner. In other—not shown—embodiments, the roof gate 55 or roof gates of the top opening may be slidably arranged to cover the top opening.

Figure 7:
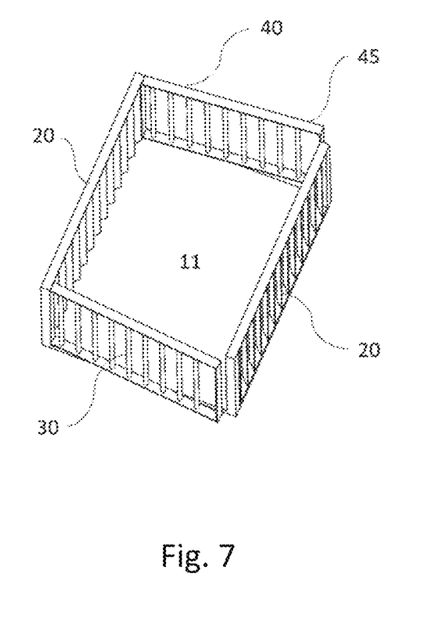
FIG. 7, in a perspective view, shows a box according to an embodiment of the invention, where the box is provided with an end gate.

As shown in FIG. 7, the end wall 40 of the box 1 may in further embodiment comprise an end gate 45. The end gate 45 may comprise or form the entire end wall 40. Alternatively (not shown), a portion of the end wall 40, may be provided with an end gate 45.

In yet other (also not shown) embodiments, the end gate 45 of the box 1 may be divided into two separate portions (two gates).

In the embodiment shown in FIG. 7, it is indicated that the end gate 45 is hinged, such that it may open/close in a pivotal manner. In other—not shown—embodiments, the end gate 45 or end gates may be slidably arranged relative to a plane defined by the end wall 40.

When the end wall 40 is provided with an end gate 45 the flexibility of evacuating animals from a box 1 is increased. Further, during loading animals into boxes, a number of boxes 1 may be aligned inlet 30 to end gate 45, with the inlet gates 35 and the end gates 45 open. Thereby, animals may be driven into the boxes 1 by utilizing their desire to follow other animals, the gates 35, 45 closing as the desired number of animals having entered each box 1.

In any of the previously described embodiments the box 1 may further be provided with a drinking water supply 100 into the box 1. Embodiments thereof are described with reference to FIGS. 8 and 9.

Figure 8:
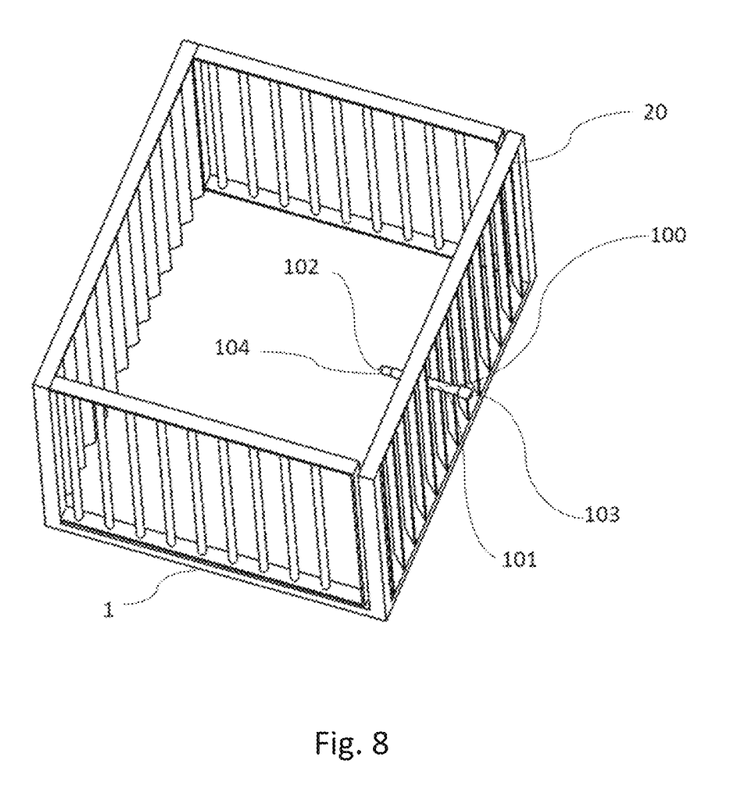
FIG. 8, in a perspective view, shows a box according to an embodiment of the invention, where the box is provided with a drinking water supply.
Figure 9:
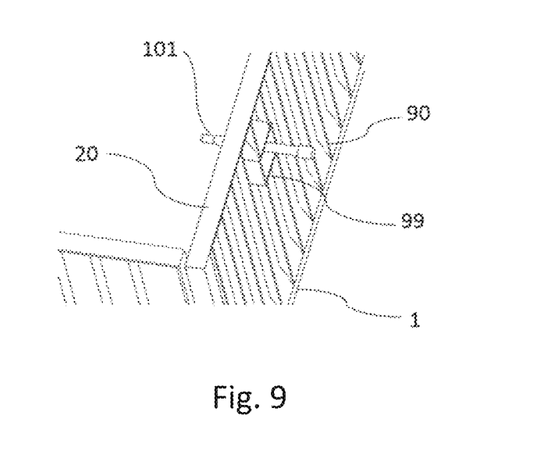
FIG. 9, shows detail of the box and drinking water supply of FIG. 8.

As shown in FIGS. 8 and 9, a drinking water supply 100 may be provided through a wall of the box 1, in the shown embodiment a sidewall 20. The drinking water supply 100 comprises a pipe 101 having a first end 102 extending into the box 1, and a second end 103 extending out of the box 1. The first end 102 may be provided with a drinking nipple 104, allowing the animals contained in the box 1 to drink therefrom. Alternatively, the first end may be provided adjacent to a trough, such that drinking water may be applied to the trough (not shown). In other alternative (not shown) embodiments, the second end 103 may be connected to a tank (not shown) provided in the box 1, which tank may provide drinking water to animals in the box 1. This aspect is described in further detail below.

The second end 103 in such embodiments, may be provided with connection means configured for connecting the pipe to an external water supply. By external water supply is meant external relative to the box.

Thus, in these embodiments the box 1 is equipped with means for providing water into the box, the drinking water supply 100 comprising means (the pipe 101) connected to the box 1, which are configured for connecting to an external water supply. In cases, where, as mentioned above, the box comprises a tank, in this embodiment, the tank may be filled from the mentioned external water supply.

As shown in FIG. 9, when the barring means are formed as slats 90, the drinking water supply 100 may be provided through a water supply opening 99 through the slats 90. Thus, the pipe 101 extends through the water supply opening 99. It may be connected to a slat 90. It will be appreciated that a similar water supply opening 99 may be provided through other types of barring means, discussed above.

In alternative (not shown) embodiment, the drinking water supply 100 may be provided at an internal wall of the box 1, the drinking water supply 100 comprising a pipe 101 having a first end 102 extending into the box volume 5, and a second end 103 connecting to a water tank in the box. The first end 102 may supply a trough located on the internal floor 11 or inner sidewall of the box 1, or it may be provided with a drinking nipple 104.

The water tank may be supplied with drinking water for example as discussed in connection with FIGS. 8 and 9 above. Alternatively, such a water tank may be filled via other means.

In not shown embodiments, such a water tank may be integrated into the bottom 10 of the box 1. In this case the water tank may be pressurized or connected via a pump installed in the box 1, to allow water to be provided into the box volume 5 via the pipe. Alternatively, such a water tank may be integrated into a frame of the box 1. In yet other embodiments, such a water tank may be provided within the box volume 5. For example, such a water tank may be provided under the roof or attached to an internal surface of a sidewall 20.

In either case, the first end of the drinking water supply 100 may preferably be provided above back height of the animal type for which the box 1 is intended.

In embodiments, alternative to the drinking water supply having parts on the box as such, a water supply opening 99 may be provided through a wall of the box, the water supply opening 99 being configured to allow insertion of an external drinking water supply into the box volume 5. This may be provided through a sidewall 20 for example as shown in FIG. 9 (without the pipe connection). Such an external drinking water supply may comprise a (not shown) drinking nipple. Alternatively, water may be supplied to a trough (not shown).

Not shown in the figures, in a further embodiment, the bottom 10 may comprise a manure tank for collection of manure and urine. In such cases the internal floor 11 of the bottom 10 may comprise one or more floor elements having openings formed there through for allowing manure and urine to pass, where the openings are in fluid communication with the manure tank. In some embodiments the internal floor 11 of the bottom comprises a plurality of floor elements, and the openings are formed as elongate slots formed there between. Further, such slots are preferably less than or equal to 25 mm wide to avoid the animals getting limbs stuck in the slots.

In a further embodiment of any of the previously described embodiments, the box 1 is rectangular, having a width from sidewall 20 to sidewall 20, and where the width to length ratio is 4:5 or smaller. In a further embodiment, the width is 2 meters and the length of the box 2.5 meters to 10 meters.

As an example, the box may be utilized for containing 1-15 pigs, such as 7-8 pigs.

In either of the above-described embodiments, the bottom 10 of the box may preferably be configured for cooperating with a mechanism for moving the box, e.g. a conveyor.

It is to be noted that the figures and the above description have shown the example embodiments in a simple and schematic manner. Many of the specific mechanical details have not been shown since the person skilled in the art should be familiar with these details and they would just unnecessarily complicate this description.

The invention claimed is:

1. A box for containing one or more four-legged live slaughter animals, in particular hoofed animals, prior to slaughter, the box comprising: a bottom; two sidewalls extending along sides of the bottom, and having a length; a gated inlet formed at a first end of the sidewalls; and an end wall formed at a second end of the sidewalls and opposite from the gated inlet; wherein the end wall is configured for allowing the one or more animals in the box to see through the end wall when at the inlet to the box, wherein at least one sidewall of the two sidewalls is provided with a ventilation window formed as a through-going opening through the at least one sidewall, wherein the ventilation window comprises a plurality of slats for preventing an animal from extending its head through the ventilation window, which the plurality of slats are further configured to prevent an animal from viewing through the ventilation window as it enters the box through the inlet, wherein the plurality of slats prevent outlook through the ventilation window of the sidewall when viewed from a position at the inlet of the box, and wherein the plurality of slats are provided by a plurality of spaced apart vertical slats arranged side by side in a lengthwise direction of each ventilation window, a vertical slat opening being provided between neighboring slats, an inner slat surface of each slat facing towards an internal volume of the box, and an opposite outer slat surface facing towards an external side of the box, and each slat being angled relative to a longitudinal direction of the sidewalls; and wherein the plurality of slats are tiltable along a vertical axis.

2. The box according to claim 1, wherein the angle is 10-45°.

3. The box according to claim 1, wherein the ventilation window of a sidewall extends from an internal floor of the bottom to a top of the sidewall.

4. The box according to claim 3, wherein a cover plate is arranged on an inside of the plurality of slats extending 10-30 cm above an internal floor of the bottom.

5. The box according to claim 1, wherein a sidewall is provided with a lower portion comprising a closed surface extending 10-30 cm above an internal floor of the bottom.

6. The box according to claim 1, further comprising a roof.

7. The box according to claim 6, wherein the roof is formed as a mesh.

8. The box according to claim 6, wherein the roof comprises a roof gate.

9. The box according to claim 1, wherein the end wall comprises an end gate.

10. The box according to claim 1, wherein a drinking water supply into the box is provided.

11. The box according to claim 10, wherein the drinking water supply is provided through at least one sidewall of the two sidewalls or the end wall of the box, the drinking water supply comprising a pipe having a first end extending into the box and a second end extending out of the box, where the first end is provided with a drinking nipple, and the second end is arranged to connect the pipe to an external water supply.

12. The box according to claim 11, wherein the pipe is provided through a water supply opening through the slats.

13. The box according to claim 10, wherein the drinking water supply comprises a pipe having first end extending into the box volume, and a second end connecting to a water tank integrated in the box.

14. The box according to claim 13, wherein the water tank is integrated in the bottom of the box.

15. The box according to claim 1, wherein a water supply opening is provided through at least one sidewall of the two sidewalls or the end wall of the box, the water supply opening being configured to allow insertion of a first end of an external drinking water supply into the box volume.

16. The box according to claim 11, wherein the first end of the drinking water supply is provided above back height of the animal type for which the box is intended.

17. The box according to according to claim 12, wherein the water supply opening is provided through the slats barring the ventilation window of a sidewall.

18. The box according to claim 1, wherein the bottom comprises a collection tank for collection of manure and urine,
  wherein an internal floor of the bottom comprises one or more floor elements having openings formed therein,
  wherein the openings to allow manure and urine to pass through, and wherein the openings are in liquid communication with the collection tank.

* * * * *